(12) United States Patent
Kuzuu

(10) Patent No.: US 7,055,245 B2
(45) Date of Patent: Jun. 6, 2006

(54) NAIL CLIPPER FOR PETS HAVING SEMI-SPHERICAL SHAPE

(75) Inventor: Masayuki Kuzuu, Tochigi (JP)

(73) Assignee: Yuko Kuzuu, Tochigi (JP)

( * ) Notice: Subject to any disclaimer, the term of this patent is extended or adjusted under 35 U.S.C. 154(b) by 178 days.

(21) Appl. No.: 10/728,474

(22) Filed: Dec. 4, 2003

(65) Prior Publication Data
US 2004/0134505 A1    Jul. 15, 2004

(51) Int. Cl.
    A45D 29/02    (2006.01)
(52) U.S. Cl. .............................. 30/29; 30/173; 30/244
(58) Field of Classification Search ................ 30/175, 30/186, 173, 194, 278, 279.2, 28, 29, 26, 30/191–193, 185
See application file for complete search history.

(56) References Cited

U.S. PATENT DOCUMENTS 1,592,073 A * 7/1926 Boyle ......................... 30/113.2
1,809,556 A * 6/1931 Jolidon .......................... 30/29
3,680,210 A * 8/1972 Steinman ....................... 30/28
4,228,585 A * 10/1980 Nelson .......................... 30/29
6,473,969 B1 * 11/2002 Rinaldi ......................... 30/28

* cited by examiner

Primary Examiner—Allan N. Shoap
Assistant Examiner—Omar Flores Sánchez
(74) Attorney, Agent, or Firm—Leighton K. Chong; Godbey Griffiths Reiss & Chong

(57) ABSTRACT

A nail clipper for pets has a first semi-spherical or semi-elliptical part which is hollowed-out with a circular or elliptical hole with a blade formed on a rim of the hole, and a second semi-spherical or elliptical part having a shape matching the outside of the first part and a blade formed on a rim thereof. By placing the pet's nail in the hollowed-out hole of the first semi-spherical or elliptical part and rotating the second part along the outside of the first part, the blades of the first and second parts come together to cut the pet's nail, producing smooth nail edges cut in a semi-circular shape in a single cutting action.

7 Claims, 2 Drawing Sheets

NAIL CLIPPER FOR PETS HAVING SEMI-SPHERICAL SHAPE

TECHNICAL FIELD

This invention generally relates to a nail clipper for pets, and particularly, to one having a semi-spherical or semi-elliptical shape.

BACKGROUND OF INVENTION

The conventional nail clipper for pets, such as dogs and cats, typically has a straight or slightly curved cutting edge. This presents a problem in that the nail when cut may have a sharp edge.

SUMMARY OF INVENTION

In accordance with the present invention, a nail clipper for pets has the following distinctive features. The nail clipper has a first part formed in a semi-spherical or semi-elliptical shape. It is made of a hard material such as metal, and can be fabricated by splitting a spherical or elliptical part and hollowing its interior. The hollowed-out semi-spherical or elliptical part has a circular or elliptical hole, and has a blade formed on a rim of the hole. The first semi-spherical or elliptical part is formed with two holes (on opposite sides) where a pin is inserted and bears on the part therein. A second semi-spherical or elliptical part is also formed with a matching spherical or elliptical shape and made of a hard material such as metal. It is also made by hollowing the interior of a portion of a spherical or elliptical part, and is formed with a blade on its rim. The blade may be formed (in cross-section) as a straight line, a curved line, or a "V" shape. The second part is formed with two holes (on opposite sides) and held pivotably to the first semi-spherical or elliptical part by the pin as its axis of rotation. By placing the pet's nail in the hollowed-out hole of the first semi-spherical or elliptical part and rotating the second part along the outside of the first part, the blades of the first and second parts come together to cut the pet's nail. The invention produces smooth nail edges cut in a semi-circular shape in a single cutting action.

Other objects, features, and advantages of the present invention will be explained in the following detailed description of the invention having reference to the appended drawings.

DETAILED DESCRIPTION OF INVENTION

Figure 1A:
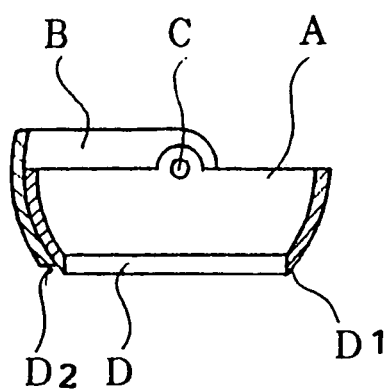
FIG. 1A is a side sectional view.
Figure 1B:
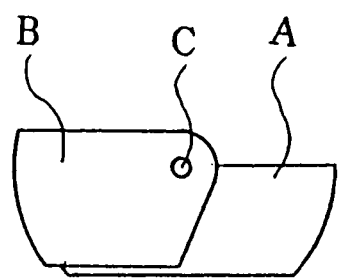
FIG. 1B is a side elevation view.
Figure 1C:
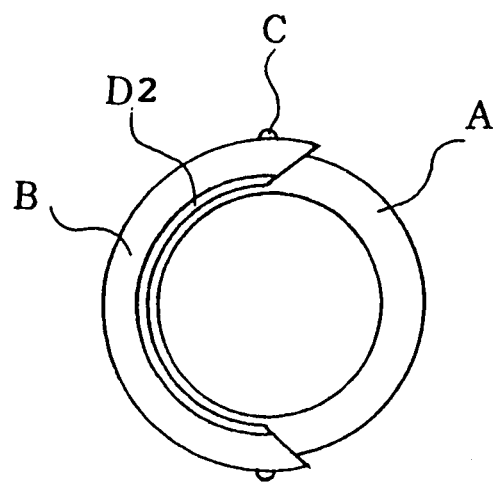
FIG. 1C is an overhead view of the working parts of a preferred embodiment of a nail clipper for pets in accordance with the present invention.

Referring to FIGS. 1A–1C, a nail clipper for pets has a first part A formed in a semi-spherical or semi-elliptical shape. It is made of a hard material such as metal, and can be fabricated by splitting a spherical or elliptical part and hollowing its interior. The hollowed-out semi-spherical or elliptical part has a circular or elliptical hole D, and has a blade D1 formed on a rim of the hole D. The first semi-spherical or elliptical part A is formed with two holes on opposite diametrical sides where a pin C is inserted and bears on the part therein.

A second semi-spherical or elliptical part B is also formed with a spherical or elliptical shape matching the outside of the first part and is made of a hard material such as metal. It is also made by hollowing the interior of a split-off portion of a spherical or elliptical part, and is formed with a blade D2 on its rim. The blade may be formed (in cross-section) as a straight line, a curved line, or a "V" shape. The second part is also formed with two holes on opposite diametrical sides and held pivotably to the first semi-spherical or elliptical part by the pin C on each side as its axis of rotation. When the pet's nail is placed in the hollowed-out hole D of the first semi-spherical or elliptical part A, the second part B can be rotated to bring its blade D2 over the outside of the first part and over its blade D1, so that they come together to cut the pet's nail.

The range of dimensions of the parts of the nail clipper may be as follows. For a semi-spherical device shape, a first semi-spherical part A can have a wall thickness in the range of about 0.1 mm to about 12.0 mm, an interior diameter of 2.0 mm to 80.0 mm, and an exterior diameter of 2.2 mm to 104.0 mm. The semi-spherical part A can have a circular hole of from 1.5 mm to 70.0 mm diameter, or an elliptical hole with major diameter of 1.5 mm to 70.0 mm and minor diameter of 1.0 mm to 65.0 mm. The second semi-spherical part B can also have a wall thickness in the range of about 0.1 mm to about 12.0 mm, and other dimensions matching the outside of the first part A and the functions as described previously.

For a semi-elliptical device shape, a first semi-elliptical part A can have a wall thickness in the range of about 0.1 mm to about 12.0 mm, an interior major diameter of 2.5 mm to 90.0 mm and minor diameter of 2.0 mm to 80.0 mm. The semi-elliptical part A can have an elliptical hole with a major diameter of from 1.5 mm to 75.0 mm and a minor diameter of 1.0 mm to 65.0 mm. The second semi-elliptical part B can also have a wall thickness in the range of about 0.1 mm to about 12.0 mm, and other dimensions matching the outside of the first part A and the functions as described previously.

The preferred dimensions of the parts of the nail clipper may be as follows. For a semi-spherical device shape, a first semi-spherical part A can have a wall thickness of about 1.0 mm, an interior diameter of 8.0 mm and an exterior diameter of 10.0 mm. The semi-spherical part A can have a circular hole of 6.0 mm diameter. The second semi-spherical part B can also have a wall thickness of about 1.0 mm and other dimensions matching the outside of the first part A and the functions as described previously.

For a preferred semi-elliptical device shape, a first semi-elliptical part A can be made of carbon steel material and have a wall thickness of 2.0 mm, an interior major diameter of 10.0 mm and minor diameter of 8.0 mm. The semi-elliptical part A can have an elliptical hole with major/minor diameters of 7.0 mm and 5.5 mm. The second semi-elliptical part B can also have a wall thickness of about 2.0 mm, and other dimensions matching the outside of the first part A and the functions as described previously.

Figure 2:
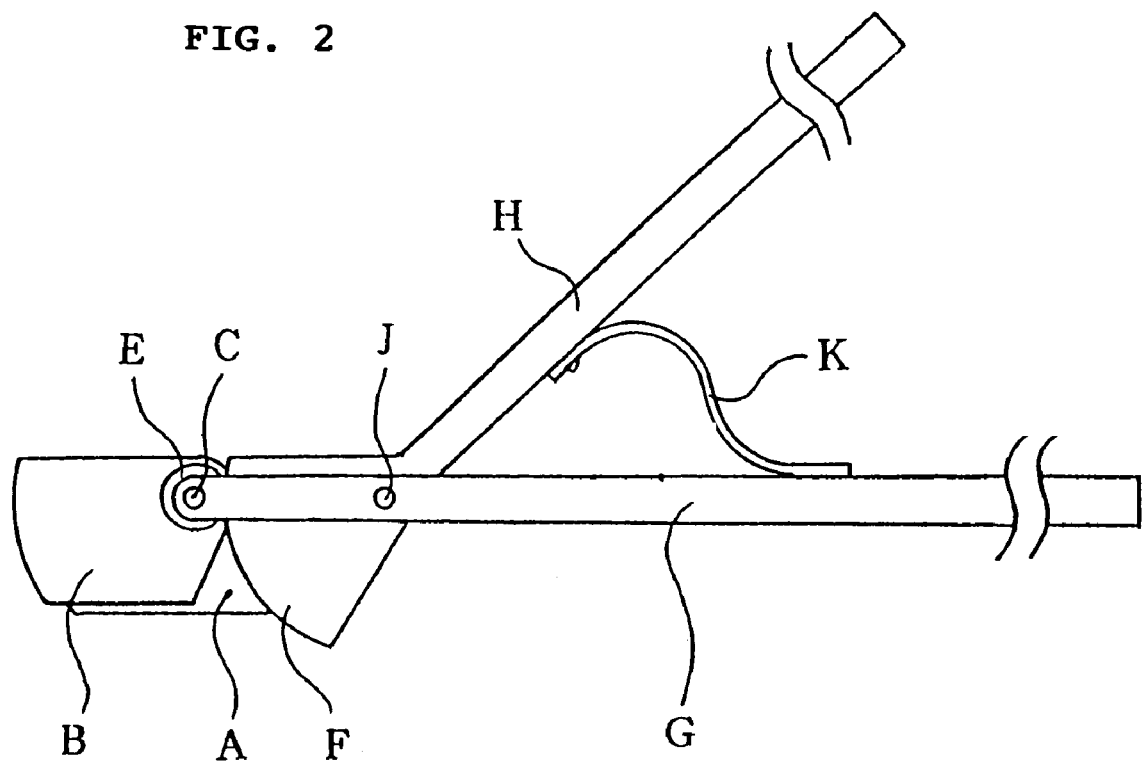
FIG. 2 is a side elevation view of the nail clipper for pets as assembled for use.

Referring to FIG. 2, the first part A and second part B are shown assembled in the nail clipper device, held together rotatably by the pins C. A cog E is attached on the surface of the semi-spherical or elliptical part B where the pin C is placed. The pin C and the cog E use the same shaft. The cog E is engaged with a large fan-shaped cog F having a radius four to eight times greater than the radius of cog E (for multiplied leverage). An operating lever H is coupled to the fan-shaped cog F to rotate it. The pin J is at the pivot center of the fan-shaped cog F. The pin J and the pin C are journaled in the operating lever G and stabilize the operating lever G on the semi-spherical or elliptical part A. A spring K is placed between the movable parts of the operating lever G and the operating lever H. Pivoting the operating lever G and the operating lever H together rotates the semi-spherical or elliptical part B around the semi-spherical or elliptical part A to cut the pet's nail placed in the hole in the part A. The cutting movement produces smooth nail edges cut in a semi-circular shape in a single cutting action.

It is understood that many modifications and variations may be devised given the above description of the principles of the invention. It is intended that all such modifications and variations be considered as within the spirit and scope of this invention, as defined in the following claims.

What is claimed is:

1. A nail clipper for pets comprising:
   (a) a first semi-spherical or semi-elliptical part made of a hard material such as metal and having a hollowed-out circular or elliptical hole with a blade formed on a rim of the hole;
   (b) a second semi-spherical or elliptical part having a shape matching the outside shape of said first part and having a blade on a rim thereof;
   (c) means for mounting the second part pivotably with respect to the first part along an axis of rotation, such that, when a pet's nail is placed in the hollowed-out hole of the first semi-spherical or elliptical part and the second part is rotated along the outside of the first part, the blades of the first and second parts come together to cut the pet's nail in a semi-circular shape in a single cutting action,
   wherein said first and second parts are held together rotatably with respect to each other by pivot pins on opposite diametrical sides thereof, and said first part is mounted to a first operating lever, and said second part is rotated by a second operating lever pivotable with respect to said first operating lever, and
   wherein a driven cog is attached on the surface of said second part where a pivot pin is placed, and the driven cog is engaged with a large fan-shaped cog coupled to said second operating lever.

2. A nail clipper for pets according to claim 1, wherein said first part is formed by splitting a spherical or elliptical part and hollowing its interior.

3. A nail clipper for pets according to claim 1, wherein said second part is formed by splitting off a portion of a spherical or elliptical part and hollowing its interior.

4. A nail clipper for pets according to claim 1, wherein said first and second parts are formed with a semi-spherical shape.

5. A nail clipper for pets according to claim 1, wherein said first and second parts are formed with a semi-elliptical shape.

6. A nail clipper for pets according to claim 1, wherein said large fan-shaped cog has a radius four to eight times greater than that of said driven cog.

7. A nail clipper for pets according to claim 1, wherein a spring is provided between pivotable parts of said second and first operating levers.

* * * * *